Sept. 20, 1971  A. F. TURK  3,606,183
COIL WINDING APPARATUS

Filed March 17, 1969  4 Sheets-Sheet 1

INVENTOR:
ANTON F. TURK
BY: James E. Nilles
ATTORNEY

INVENTOR:
ANTON F. TURK

BY: James E. Nilles
ATTORNEY

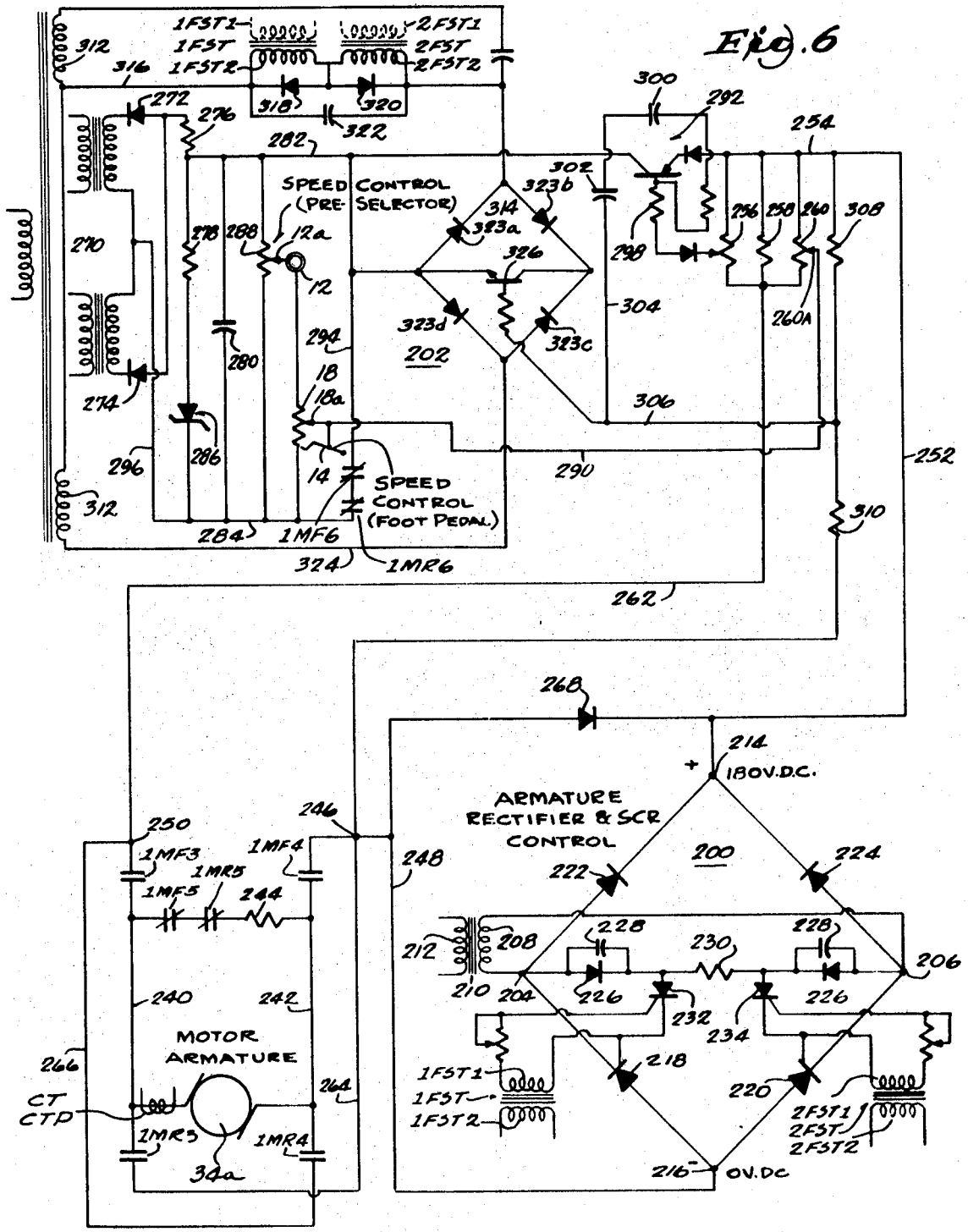

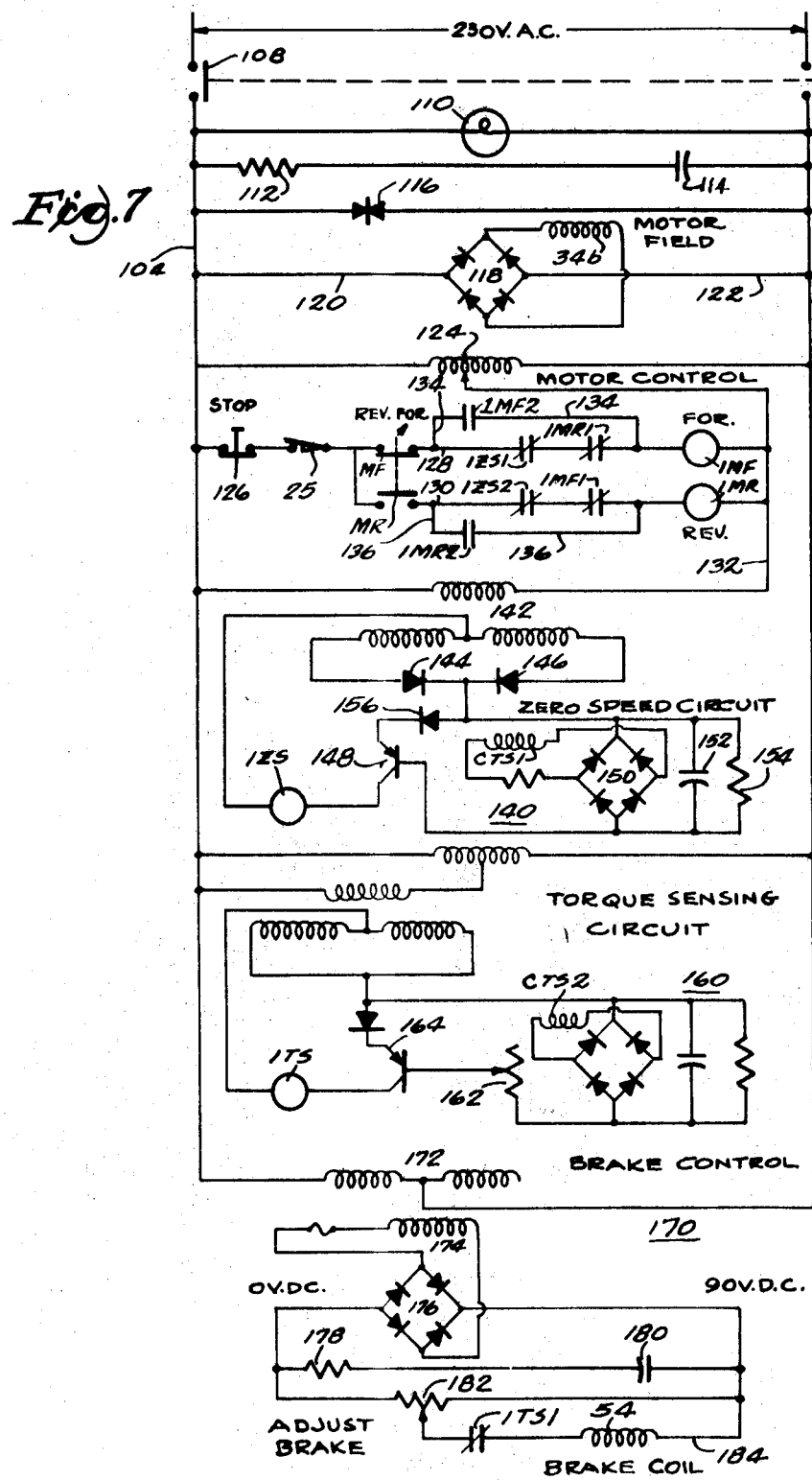

United States Patent Office 3,606,183
Patented Sept. 20, 1971

3,606,183
COIL WINDING APPARATUS
Anton F. Turk, New Berlin, Wis., assignor to
Steel Fabricating Inc., Elm Grove, Wis.
Filed Mar. 17, 1969, Ser. No. 807,597
Int. Cl. H01f *41/06;* B65h *81/06*
U.S. Cl. 242—7.07
9 Claims

ABSTRACT OF THE DISCLOSURE

Flexible material is wound onto a form driven by electric motor operated transmission. To maintain constant tension on the material being wound, a brake prevents or regulates rotation of the winding form. A torque sensing circuit is connected to the brake to positively hold the form and prevent its rotation in an unwinding direction until the driving torque of the transmission reaches a predetermined value.

BACKGROUND OF THE INVENTION

In winding devices of the character to which the present invention relates, the wires to be wound are pulled from supply rolls and often many wires are wound simultaneously on a spindle. In addition, these wires are often passed through straightening devices or are otherwise "worked" together prior to reaching the winding spindle. As a result, the spindle must be provided with a considerable amount of driving torque in order to be able to pull these wires, and the wires are under considerable tension. Consequently, when it is necessary for the operator to stop the rotating spindle during the winding operation, for example, to check or adjust the machine, or to check the quality of the "wind" being made, there is a strong force on the spindle tending to cause it to rotate in the unwinding direction. The spindle must be prevented from any such unwinding in order to prevent the wound wires from being loose, or to any degree unwound.

Many prior art winding machines have not been able to absolutely hold the spindle from the above mentioned unwinding characteristics and have been unable to prevent spindle unwinding particularly at the moment the driving torque from the spindle driving motor was again applied to the spindle after the latter had been stopped. These prior art machines usually required an exceptionally large motor as their power supply, and were generally incapable of the precise control required on the spindle in order to prevent loose windings, air gaps, poorly formed coils, improperly spaced and positioned turns of wire, or other undesirable characteristics in the finished coil.

SUMMARY OF THE INVENTION

The present invention provides an electrically driven winding machine for winding flexible members, such as electrical wires, ribbons or similar members onto a rotating form, such as a core or core form held on a driven spindle. The machine has a brake for the driven spindle and electrical control apparatus for the brake to insure that the wires being wound are at all times maintained at a proper tension to thereby prevent looseness or air gaps in the windings of the finished coil. If, for some reason, the winding spindle has been stopped and held by the brake during the winding operation, the control apparatus includes a torque sensing circuit which will not permit the spindle brake to again be released until there is a certain predetermined driving torque on the spindle and consequently proper tension in the wires being wound.

The control circuit provided by the present invention includes a manually operated variable spindle speed control which permits the spindle speed to be brought smoothly up to its operating speed without any jerking or erratic rotational movement.

These and other objects and advantages of the present invention will appear hereinafter as this disclosure progresses, reference being had to the accompanying drawings.

BRIEF DESCRIPTION OF THE DRAWINGS

FIG. 6 is an electrical diagram of a running circuit used with the present invention; and FIG. 7 is an electrical diagram of a control circuit used with the present invention.

DESCRIPTION OF THE PREFERRED EMBODIMENT

Figure 1:
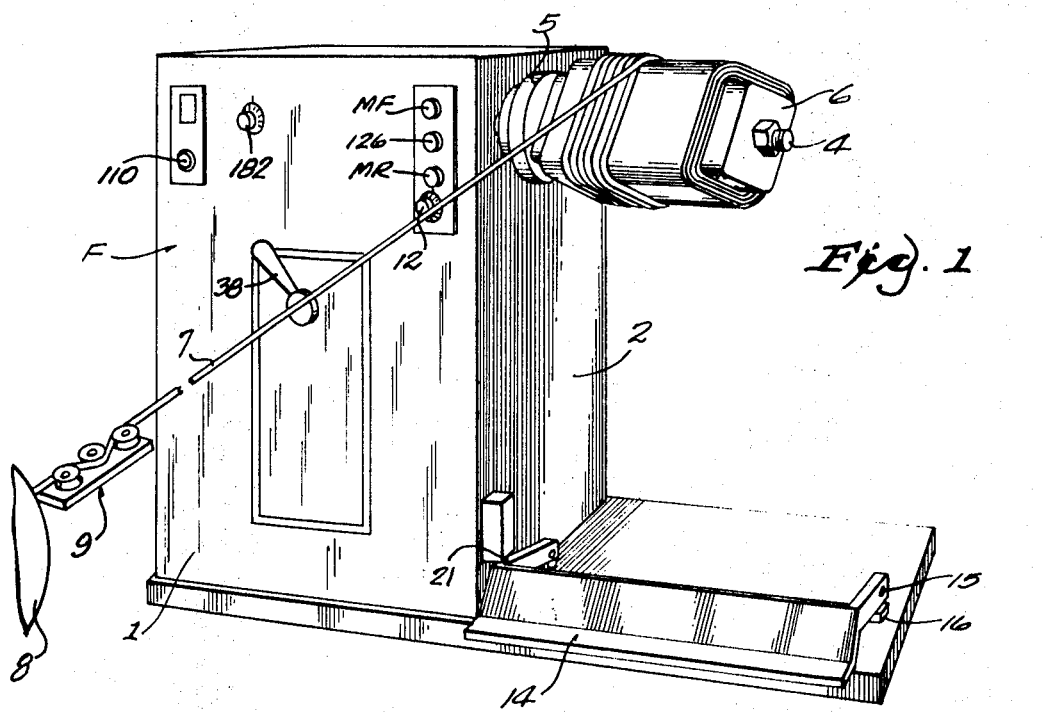
FIG. 1 is a perspective view of a coil winding machine embodying the present invention.

Referring in greater detail to the drawings, the machine includes a rectangular sheet metal frame F having a front, operator's side 1, a right side 2 and a left side 3. A driven spindle 4 extends through side 2 and has a driving head 5 secured thereto and on which a core form 6 is fixed for rotation therewith. It is around this form 6 that the flexible material, such as wires 7, is to be wound. Various types of flexible material may be wound, such as wires, bands of metal or the like, and it will also be understood that any number of strands of material may be wound at one time onto the core form. Furthermore, various shapes and sizes of core forms may be used, or the material may be wound directly onto a core for an electrical armature, or the like, detachably held by the driving head 5 or other holding device.

As shown in FIG. 1, the wire 7 comes from a source of supply, such as a supply roll 8 and may be passed through a wire straightening device 9 before it is wound on the core form 6. The tension in the flexible material as it approaches the core form is very considerable and it creates a strong force on the spindle in an unwinding direction, that is in a rotational direction opposite to that in which the spindle is to be driven to wind the coil or other structure being formed by the machine.

Consequently, absolute and precise control of the spindle must be exercised at all times, particularly when the spindle has been stopped and held in place by a brake, and it is then desired to again apply the driving force to the spindle to continue the winding operation.

Figure 4:
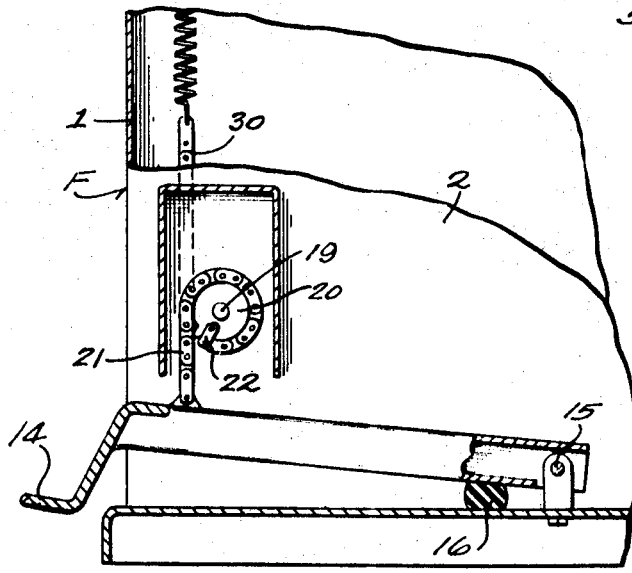
FIG. 4 is a fragmentary, sectional view taken along line 4—4 in FIG. 2, but on an enlarged scale.
Figure 5:
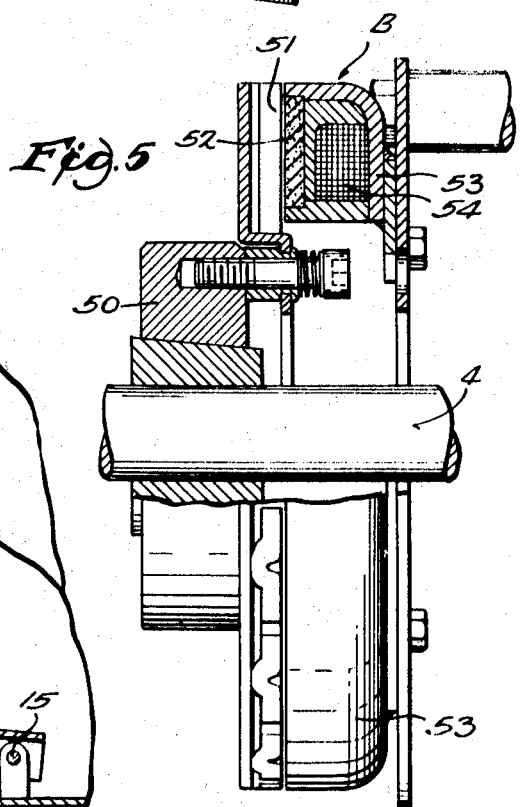
FIG. 5 is an enlarged view of the electric brake shown in FIG. 2, certain parts being shown as broken away and in section for clarity.

The speed of the spindle can be set at a given, predetermined but adjustable speed, and this setting is determined by the adjustable knob 12 (FIG. 1) on the front of the machine. The speed of the spindle can also be adjusted by the foot pedal 14 which is under control of the operator. The pedal 14 is pivoted at 15 (FIGS. 1 and 4) and a rubber spring 16 is provided for the pedal. As will appear in more detail later, the foot pedal can adjust the speed of the spindle from a stopped position, when the pedal is released and in its uppermost position (FIGS. 1, 2 and 4), to the maximum speed, as determined by the setting of the control knob 12, when the pedal is fully depressed. The arm 18a of the potentiometer is fixed to the end of a shaft 19 for rotation therewith. Shaft 19 is rotated in one direction or the other by movement of the foot pedal, as follows. A sprocket 20 is fixed to the opposite end of shaft 19 and a flexible member in the form of a roller chain 21 is fixed at one end to the foot pedal, trained around a portion of the sprocket 20 and its other end is then fixed to the sprocket, as at 22 (FIG. 4). Vertical movement of the pedal is thus translated into rotary movement of the potentiometer arm 18a and also of a cam 24 fixed on shaft 19.

A limit-switch 25 has a plunger follower 26 that rides on the periphery of cam 24. As will more fully appear later, the electrical circuit of the machine is energized when the follower 26 is located on the rise 27 of the cam.

Figures 2, 3:
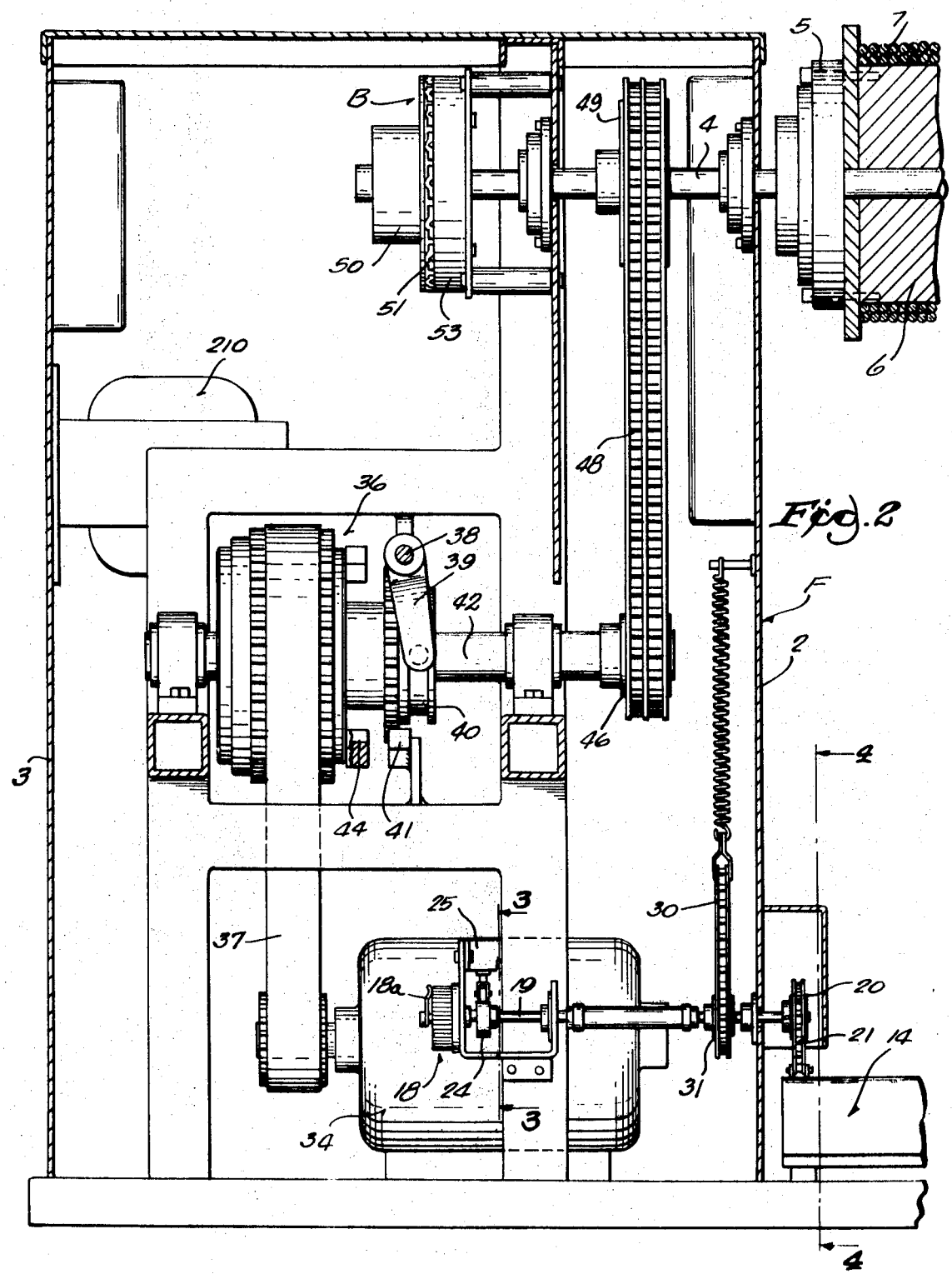
FIG. 2 is a front elevational view of the machine shown in FIG. 1, but on an enlarged scale, and certain parts being shown as removed, broken away or in cross section for clarity in the drawing.
FIG. 3 is a sectional view taken along line 3—3 in FIG. 2.

As shown in FIGS. 2 and 4, means are provided for biasing the pedal to the upper position at which time the brake is applied. This means comprises a spring loaded chain 30 which is trained around and fixed to a sprocket 31 fast on shaft 19.

The spindle 4 is driven from a source of power, such as a three horsepower, DC electric motor 34. The armature 34a of this motor is shown in FIG. 6, and the field 34b is shown in FIG. 7. The motor 34 drives a conventional two speed transmission 36 through a conventional endless timing belt 37. Either speed of the transmission is selected by a lever 38 (FIG. 1) on the front of the machine which through a shifting yoke 39 (FIG. 2) slides the gear collar 40. When the gear collar has been shifted to the position shown in FIG. 2 where it meshes with the stationary, internal gear 41, the high speed is obtained through the transmission to its output shaft 42. When the gear collar 40 is shifted to the left (as viewed in FIG. 2), to mesh with the internal gear 44 of the transmission, a low speed is obtained. Because the two speed transmission itself is conventional, further description of it is not believed to be either necessary or desirable. It is being sufficient to only say further that it may be of the type made by the Transmission Products Division of Airborne Accessories Corporation of Hillside, N.J., and is sold under the tradename of "Rotomission" and utilizing a shaft mounted, planetary differential drive and also a rotating gear case as the input member.

Power from the transmission shaft 42 is then transmitted through sprockets 46 fixed on shaft 42 and endless chains 48 which are trained around the sprockets 46 and also around sprockets 49 fixed to spindle 4.

The electric brake B may be of the type made by the Dynamatic Division of Eaton Manufacturing Company, located at Kenosha, Wis., and which brake has a hub 50 rigidly fixed on shaft 4. The hub has a friction engaging surface 51 which is adapted to be engaged by the friction surface 52 of the brake housing 53 which is rigidly fixed to the machine frame. Brake engagement occurs when its electrical coil 54 is energized to set up a flux path, in the known manner.

As will appear hereinafter, the electrical circuit includes a torque sensing circuit, whereby when a certain predetermined amount of torque is on the motor 34, this circuit permits the brake B to be released, thereby assuring that a certain predetermined amount of tension is in the wires approaching the spindle so as to insure that no slack or looseness occurs in the wires. The armature control of the motor, as will presently appear, is such that the brake will not be released until there is a certain amount of driving torque on the spindle and consequently adequate tension in the wires being wound to prevent backlash.

The electrical circuit of the present invention will now be referred to in detail, reference being had particularly to FIGS. 6 and 7. The electrical control comprises a running circuit (FIG. 6) which adjustably energizes the armature 34a of DC motor 34 to control the speed of the motor and a winder control circuit (FIG. 7) which coordinates the operation of motor 34 with brake B and the other component parts of the coil winding machine.

Turning first to the winder control circuit in FIG. 7, the elements of this circuit are strung between a pair of power supply buses, 104 and 106 containing circuit breakers 108. The conventional indicator light 110 and filter comprised of resistor 112, capacitor 114, and diode 116 are connected in parallel across the power supply buses. A full wave rectifier bridge 118 has its input terminals connected to buses 104 and 106 by conductors 120 and 122 and its output terminals connected to motor field 34b for exciting the motor field winding.

A control transformer 124 is interposed across power buses 104 and 106 for energizing a pair of parallel connected relay circuits which control the direction of rotation of motor 34. A stop button 126, provided on the operator's side 1 of frame F, is connected to power supply bus 104 and in series with parallel connected reversing switch contactors MF and MR located in parallel conductors 128 and 130. Stop button 126 is also connected in series with limit switch 25 operated by foot pedal 14. Parallel conductors 128 and 130 extend between stop switch 126 and conductor 132 connected to the center tap of transformer 124. The conductors include motor rotation direction relay coils 1MF and 1MR, the usual interlocking relay contacts 1MF1 and 1MR1, and zero speed relay contacts 1ZS1 and 1ZS2 of zero speed relay coil 1ZS, hereinafter described. A pair of hold-in relay contacts 1MF2 and 1MR2 are connected in conductors 134 and 136, respectively, connected directly between reversing switch contactors MF and MR and relay coils 1MF and 1MR.

The winder control circuit includes zero speed circuit 140 which prevents reversal of the direction of rotation of motor 34 except when the motor is at a standstill or zero speed. The circuit includes a power supply comprised of transformer 142 and diodes 144 and 146 which energize the emitter-collector circuit of transistor 148. The zero speed relay coil 1ZS is connected in series with the power supply and the emitter-collector circuit of transistor 148. The base-circuit of transistor 148 includes a rectifier bridge 150, the input terminals of which are connected to the secondary winding CTS1 of current transformer CT (FIG. 6). The primary winding CTP of current transformer CT is connected in series with armature 34a so as to provide a signal in secondary winding CTS1 when armature current is present in the armature. The presence of armature current is deemed an indication that the armature of motor 34 is rotating. The output of rectifier bridge 150 is filtered by capacitor 152 and resistor 154 and provided to the base-emitter circuit of transistor 148 through diode 156.

A torque sensing circuit 160 is also included in the winder control circuit for actuating brake B. This circuit is identical to zero speed circuit 140 with the exception that the magnitude, as well as the presence, of the armature current, as sensed by control transformer secondary winding CTS2, is utilized by the circuit. The magnitude of the armature current is deemed to be proportional to the torque output of the armature of motor 34. Resistor 162 is provided in the base circuit of transistor 164 to render transistor 164 operative at a desired level of motor armature current and torque. Torque sensing relay coil 1TS is included in the emitter-collector circuit of transistor 164.

Brake control circuit 170 controls the operation of brake B. The circuit includes multi-tap transformer primary winding 172 which is used to correlate the voltage in power buses 104 and 106 to the rated voltage of brake coil 54. The secondary winding 174 is connected to the input terminals of rectifier bridge 176 which provides a filtered direct current voltage of the desired level at its output terminals through resistor 178 and capacitor 180. Potentiometer 182 is connected across the output of rectifier bridge 176 and the wiper is connected to brake coil 54 through relay contacts 1TS1 of torque sensing relay coil 1TS. The other end of brake coil 54 is connected directly to rectifier bridge 176 via conductor 184.

Turning now to the running circuit of FIG. 6, this circuit comprises, in general, a controlled rectifier bridge 200 for energizing armature 34a and a firing circuit 202 for controlling the operation of the controlled rectifiers of the bridge and the speed of motor 34 is accordance with the position of the operator's foot pedal 14.

Controlled rectifier bridge 200 includes input terminals 204 and 206 which are connected to the secondary winding 208 of transformer 210. The primary winding 212 of transformer 210 is connected to the winder power supply. A pair of oppositely poled controlled rectifiers are connected between input terminal 204 and positive output terminal 214 and negative output terminal 216 and between input terminal 206 and positive output terminal 214 and negative output terminal 216. Two of these controlled rectifiers, 218 and 220, are controlled rectifiers, the conduction intervals of which may be controlled by firing circuit 202 to regulate the output of rectifier bridge 200. The other two rectifiers, 222 and 224, are uncontrolled rectifiers and conduct any time a proper bias is applied to them.

Rectifier bridge 200 includes a pair of circuits for alternately providing firing signals to controlled rectifiers 218 and 220 in synchronism with the alternating current provided to the input terminals 204 and 206 by transformer secondary winding 208. Each of these circuits is connected to an input terminal and includes diode 226 having capacitor 228 in parallel therewith. The circuits are connected to opposite ends of resistor 230. The circuit connected to input terminal 204 contains pilot controlled rectifier 232 while the circuit connected to input terminal 206 contains pilot controlled rectifier 234.

The gate-cathode circuit of controlled rectifier 232 includes the secondary winding 1FST1 of firing signal transformer 1FST while the gate cathode circuit of controlled rectifier 234 includes the secondary winding 2FST1 of firing signal transformer 2FST. The gate terminal of controlled rectifier 218 is connected in series with transformer secondary winding 1FST1 and pilot controlled rectifier 232 while the gate terminal of controlled rectifier 220 is connected in series with transformer second winding 2FST1 and pilot controlled rectifier 234.

Armature 34a is connected across buses 240 and 242 which contain relay contacts 1MF3 and 1MF4 and relay contacts 1MR3 and 1MR4 for controlling the direction of rotation of motor 34 by means of the polarity of the voltage applied to armature 34a. A dynamic braking resistor 244 is connected in parallel with armature 34a and in series with relay contacts 1MF5 and 1MR5 to provide dynamic braking to the motor 34 when stop button 126 or limit switch 25 is opened.

Negative output terminal 216 of controlled rectifier bridge 200 is connected to junction 246 by conductor 248. Positive output terminal 214 is connected to junction 250 by conductor 252, conductor 254, a plurality of parallel connected resistor-potentiometers 256, 258, and 260, and conductor 262. Reversing conductors 264 and 266 are also connected to junctions 246 and 250, respectively, to reverse the voltage polarity applied to armature 34a, responsive to the opening and closing of relay contacts 1MF3 and 1MF4 or 1MR3 and 1MR4. A diode 268 is connected between junction 246 and terminal 214 to provide a path for the inductive energy of armature 34a. The primary winding CTP of the current transformer is connected in series with motor armature 34a.

Firing circuit 202 is used to generate firing signals to controlled rectifiers 218 and 220 of controlled rectifier bridge 200 responsive to the signals generated by foot pedal 14 and maximum speed knob 12, to control the power output of rectifier bridge 200 and the speed of motor 34. A phase shift firing circuit is illustratively shown as firing circuit 202 herein, it being understood that other commonly available types of firing circuits, pulse generators, and the like, may be used, if desired.

Firing circuit 202 includes a power supply comprised of center tapped transformer 270, diodes 272 and 274, resistors 276 and 278, and capacitor 280. The output voltage of this power supply, in conductors 282 and 284, is maintained at a desired level by Zener diode 286.

A control signal circuit for generating a control signal corresponding to the desired speed of motor 34 is connected across the power supply. This control signal circuit includes potentiometer 288, the resistance element of which is connected across capacitor 280 and conductors 282 and 284. The wiper 12a of potentiometer 282 is operable by adjustable knob 12 on the front of the coil winding machine. Wiper 12a is connected to conductor 284 through potentiometer 18, the wiper 18a of which is positioned by foot pedal 14. The control signal generated by the control signal circuit is provided from the wiper 18a of potentiometer 18 to conductor 290. It will be seen that the setting of wiper 12a of potentiometer 288 determines the voltage across potentiometer 18 and hence the maximum signal obtainable on wiper 18a. In this manner, the setting of potentiometer 288 determines the maximum speed of motor 34. Potentiometer wiper 18a, operable by foot pedal 14, may select any desired portion of the maximum voltage applied to potentiometer 18 as the signal corresponding to the desired speed.

The control signal in conductor 290 is provided to the base circuit of transistor 292. The emitter of transistor 292 is connected to conductor 254 and to the rectified alternating current in that conductor produced by controlled rectifier bridge 200. The collector of transistor 292 is connected to transformer 270 via conductor 282, resistor 276, and diode 272, and via conductor 294 containing normally closed relay contacts 1MF6 and 1MR6, conductor 284 and conductor 296. The base circuit for transistor 292 includes potentiometer 260, the wiper 260a of which is connected to conductor 290 containing the speed control signal from potentiometer 18. Potentiometer 260 also provides I-R compensation to armature 34a. Potentiometer 260 is connected in parallel with resistor 258 and potentiometer 256 between conductor 254 and conductor 262. The latter potentiometer provides current limit to the armature circuit. The wiper of potentiometer 256 is connected to the base of transistor 292 by means of resistor 298.

A capacitor circuit is connected to the base of transistor 292. This capacitor circuit includes capacitors 300 and 302 in conductors 304 and 306 connected to the center of a voltage divider comprised of resistors 308 and 310. The base circuit of transistor 292 determines the point during the half cycles of alternating current applied to controlled rectifier bridge 200 that transistor 292 will be rendered conductive, resulting in the application of a firing signal to one of controlled rectifiers 218 and 220.

The output circuitry of firing circuit 202 includes the primary windings 1FST2 and 2FST2 of firing signal transformers 1FST and 2FST connected in series with transformer 312 and a bipolar signal switch 314. Specifically transformer primary windings 1FST2 and 2FST2 are connected to transformer 312 by conductor 316. The transformer primary windings are center tapped and connected in parallel with oppositely poled diodes 318 and 320 connected between the center tap and the winding ends. A capacitor 322 is connected in parallel with both windings.

Bipolar signal switch 314 is comprised of four rectifiers, 323a, b, c and d connected in a bridge configuration and having firing signal transformer primary windings 1FST2 and 2FST2 connected to one of the bridge terminals which would normally be a bridge input terminal. Conductor 324 connects a second terminal of bipolar signal switch 314 back to transformer 312. A transistor 326 is connected across the remaining terminals of the rectifier bridge so that when transistor 326 is in the conductive state, a signal of either voltage polarity may pass through switch 314, thus completing the circuit between transformer 312 and firing signal transformer primary windings 1FST2 and 2FST2.

To initiate the operation of coil winding apparatus, circuit breakers 108 are closed to energize power buses 104 and 106. Brake control circuit 170 is energized through transformer secondary winding 174. Relay contacts 1TS1 are closed as no armature current is flowing in armature winding 34a and no torque is being generated by motor 34. The actuating coil 54 of brake B is thus energized from rectifier bridge 176 through relay contacts 1TS1 to apply the brake and positively hold spindle 4 motionless.

A core form 6 of the desired shape and size is affixed to driving head 5 on spindle 4. A single wrap of wire 7 is taken around the core form 6 and the loose end of wire 7 tucked under the wrap to secure the wire to the core form. The wire straightening device 9 and other tensioning means may then be applied to wire 7. Any tendency of the wire to rotate spindle 4 is overcome by brake B which firmly holds the shaft and spindle head.

Gear shift lever 38 is moved to the desired position to select either the high speed range or low speed range of transmission 36. The maximum desired speed within the selected range is obtained by knob 12 which adjusts the position of wiper 12a in firing circuit 202.

Stop switch 126 is closed. The desired direction of rotation is selected by closing either contacts MF or MR. In the present exemplary instance, contacts MF are closed, preparing the running circuit to drive motor 34 in the forward direction. The operator steps on foot pedal 14, moving wiper 18a of potentiometer 18 to the desired position. The rotation of shaft 19 and cam 24, by foot pedal 14, causes plunger follower 26 to close limit switch 25. The closure of limit switch 25 energizes relay coil 1MF, opening interlocking relay contacts 1MF1, closing lock-up or hold-in contacts 1MF2, closing relay contacts 1MF3 and 1MF4 in conductors 240 and 242 leading to armature 34a, and opening relay contacts 1MF6 in conductor 294. The coil winding apparatus is now ready to commence a coil winding operation.

A signal corresponding to the position of wiper 18a on potentiometer 18 is provided by conductor 290 to the base of transistor 292 to determine when, during the half cycles of rectified alternating current applied to the emitter-collector circuit of the transistor, the transistor will turn on. The greater the signal in conductor 290, the earlier in the half cycles transistor 292 will turn on. The point of turn on of the transistor in the cycle is often expressed in electrical degrees and termed a firing angle.

The periodic turn-on of transistor 292, cyclically turns on transistor 326 allowing current to flow through firing signal transformer primary windings 1FST2 and 2FST2. The current flow in the primary windings will alternate between the windings depending on the polarity of the voltage supplied by transistor 312.

The current flow in primary winding 1FST2 and 2FST2 induces current in the corresponding secondary windings 1FST1 and 2FST1, alternately generating firing signals to controlled rectifiers 218 and 220 at a firing angle proportional to the magnitude of the control signal in conductor 290. The conduction of controlled rectifiers 218 and 220 causes current to flow in conductors 240 and 242 and in armature 34a, causing electro-magnetic forces which urge the rotation of the armature of motor 34 against the force of brake B.

The armature current is sensed by current transformer CT and is provided to current transformer secondary winding CTS2 in torque sensing circuit 160. When the armature current and motor torque have built up to a level sufficient to resist the force applied to core form 6 by wire 7, the current induced in current transformer secondary winding CTS2 is sufficient to bias transistor 164 on and energize relay coil 1TS. The energization of relay coil 1TS opens relay contacts 1TS1, de-energizing brake coil 54 and releasing brake B. This allows motor 34 to drive core form 6 in the desired direction to wind wire 7 thereon to form the finished electric coil.

The point at which torque sensing relay coil 1TS is energized may be adjusted by resistor 162 in accordance with the tension applied to wire 7 by wire straightening apparatus 9 to remove any snap or abruptness that might occur upon the release of brake B. The speed of spindle head 5 during the winding operation is determined by the position of foot pedal 14, which controls the firing angles of controlled rectifiers 218 and 220 and the magnitude of the armature current.

At the end of the winding operation, or at any other time when the spindle is stopped, brake B is applied to prevent unwinding of the core by the tension applied by wire 7. Under such conditions, the brake coil 54 will be energized, by the reduction of the torque output of motor 34 to a point where torque sensing relay coil 1TS is de-energized and relay contacts 1TS1 close. Spindle 4 may initially be decelerated by the use of dynamic braking resistor 244.

I claim:

1. A winding machine for winding flexible members into a coil and comprising, a rotatably driven spindle about which said members are wound, power means for driving said spindle, a brake connected with and for stopping rotation of said spindle, an electrical control circuit including a torque sensing circuit connected to said power means for actuating said power means and measuring the torque on said spindle, said sensing circuit also connected to said brake for causing said brake to positively hold said spindle and prevent its rotation in an unwinding direction until the driving torque of said power means on said spindle reaches a predetermined value, to thereby prevent loose members in the finished coil.

2. A machine as set forth in claim 1 including a manually operated variable spindle speed control means connected to said control circuit for actuating said brake and subsequently the speed of said spindle to thereby permit smooth acceleration of said spindle.

3. A machine as set forth in claim 2 including a presettable control in said speed control means for setting the maximum rotational speed of said spindle.

4. A winding machine for winding flexible members comprising, a rotatably driven spindle about which said members are wound, electric motor means for driving said spindle, a brake for stopping rotation of said spindle, an electrical control circuit for energizing said motor means and said brake and including a torque sensing circuit connected to said motor means and said brake to measure the torque on said spindle that is furnished by said motor means and for causing said brake to positively hold said spindle and prevent its rotation until the driving torque of said motor means on said spindle reaches a predetermined value.

5. A machine as set forth in claim 4 including a manually operated variable spindle speed control means connected to said control circuit for regulating said brake and subsequently the speed of said spindle to thereby permit smooth acceleration of said spindle.

6. A machine as set forth in claim 5 including a presettable control in said speed control means for setting the maximum rotational speed of said spindle.

7. A machine as set forth in claim 4 wherein said electric motor means comprises a direct current motor having field and armature windings, and said electrical control circuit provides fixed field winding excitation and variable armature winding current energization to said motor, and wherein said torque sensing circuit includes signal means connected in series with said armature winding and responsive to the current therethrough for providing a signal proportional to the torque furnished by said motor to said spindle, said torque sensing circuit further including means responsive to said signal and connected to said brake for causing said brake to positively hold said spindle until said signal reaches a predetermined value.

8. A machine as set forth in claim 7 wherein said signal means comprises a current transformer and said signal responsive means includes a relay having a coil coupled to said current transformer and relay contacts connected in series with said brake and said electrical control circuit for controlling the energization of said brake from said control circuit, said relay contacts being operable by said relay coil when said signal reaches said predetermined value for releasing said brake.

9. A machine as set forth in claim 4 wherein said electrical control means includes means for controlling the direction of rotation of said motor and spindle.

References Cited

UNITED STATES PATENTS

| | | | |
|---|---|---|---|
| 2,822,989 | 2/1958 | Hubbard et al. | 242—7.22 |
| 3,117,262 | 1/1964 | Mullin | 318—7 |
| 3,269,670 | 8/1966 | Brian, Jr. et al. | 318—7X |
| 3,338,527 | 8/1967 | Chidzey | 242—7.22 |

BILLY S. TAYLOR, Primary Examiner

U.S. Cl. X.R.

242—7.21, 25, 45, 75.51; 318—6